Fig. 3.

Patented Jan. 16, 1951

2,538,708

UNITED STATES PATENT OFFICE 2,538,708

TRANSMISSION FOR HAND TRACTORS

Eustace Loring Rose, Charleston, W. Va., assignor to Gravely Motor Plow & Cultivator Company, Dunbar, W. Va.

Application July 19, 1945, Serial No. 605,977

1 Claim. (Cl. 74—768)

This invention relates to transmissions for hand tractors.

An object of this invention is to provide a transmission equipped with reversible means whereby the device may be quickly reversed so as to facilitate movement of the tractor or driving means.

Another object of this invention is to provide a transmission of this kind which is coupled to a prime mover in the form of an internal combustion engine and which includes a drive shaft having mounted on its forward end a coupling means for coupling attachments of various kinds to the drive shaft.

A further object of this invention is to provide a transmission of this kind which is closely coupled so that it will occupy only a small amount of space thereby providing a compact power means for operating a rotary plow, a mower or other implement.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 4 is a fragmentary vertical section of the intermediate portion of the transmission, Figure 8 is a detail side elevation of the shifting fork for the transmission.

Figure 1:
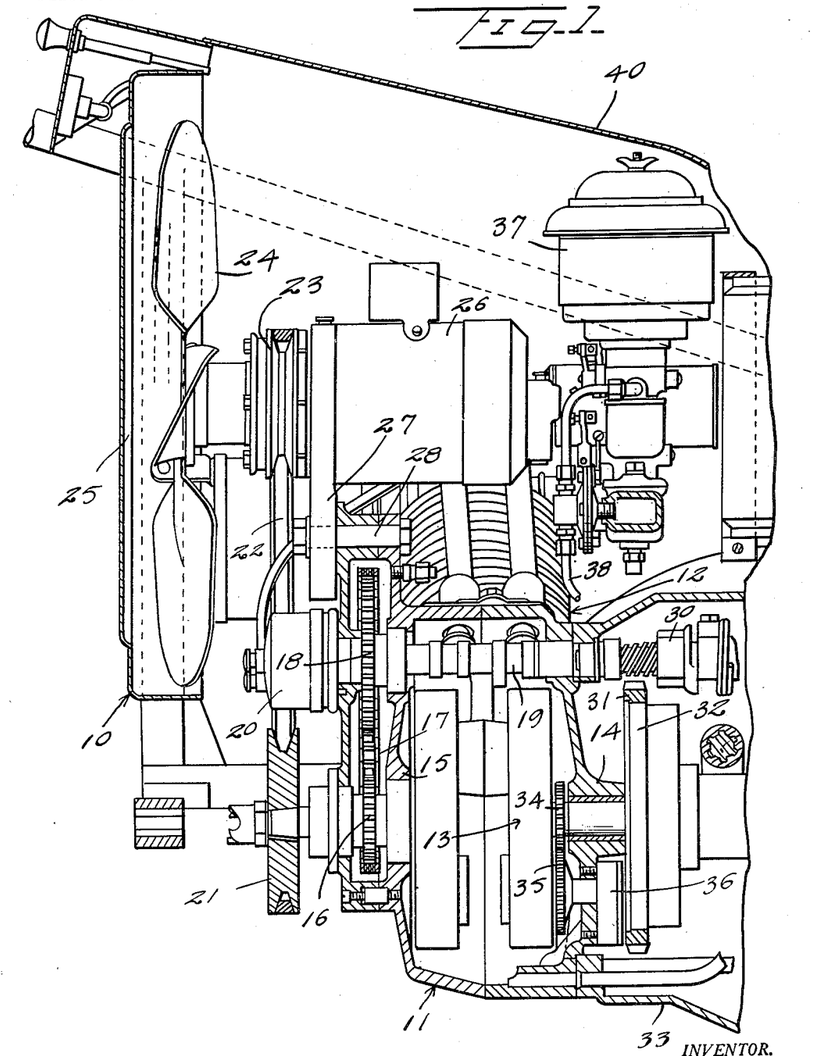
Figure 1 is a fragmentary vertical section of an internal combustion engine which is coupled with the transmission.
Figure 3:
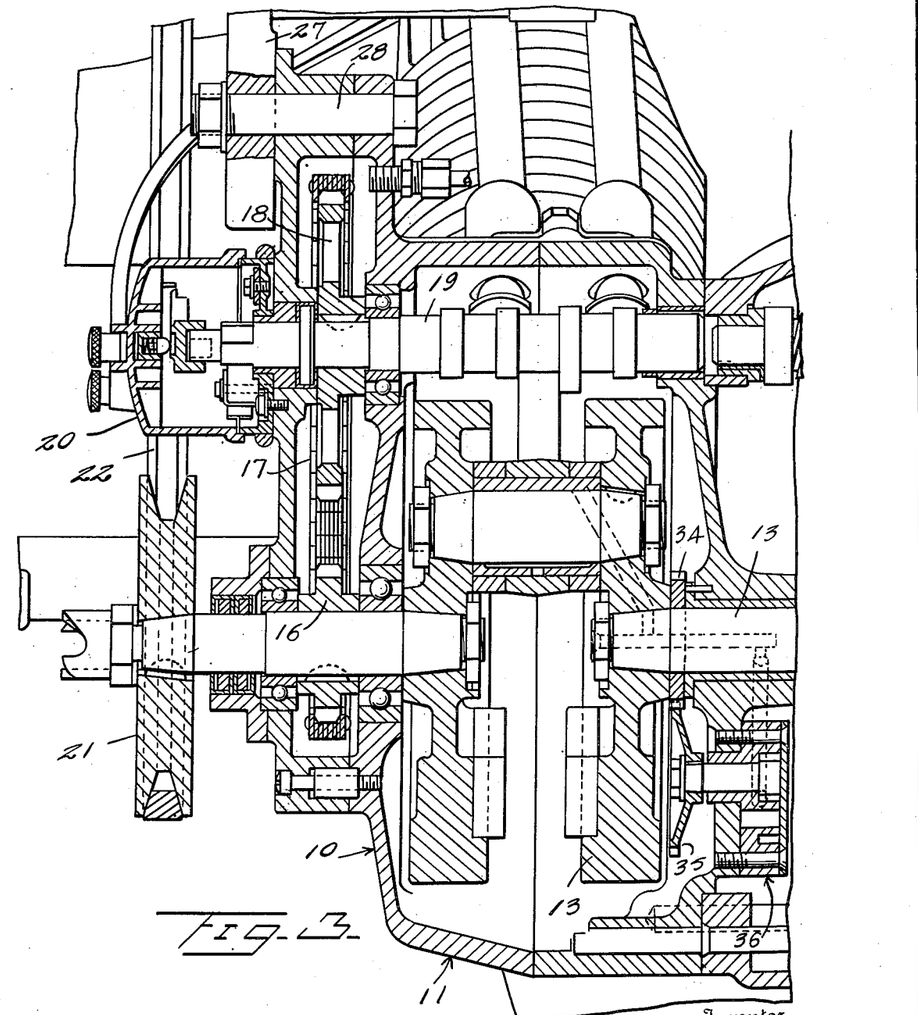
Figure 3 is an enlarged fragmentary sectional view of the lower portion of the engine.

Referring to the drawings, the numeral 10 designates generally an internal combustion engine including a crank case 11 and one or more cylinders 12 connected to the crank case. The crank case 11 has rotatably mounted therein a crank shaft 13 which is journalled in bearings 14 and 15 and the crank shaft 13 has mounted on the rear portion thereof a sprocket 16 with which a chain 17 is engaged. The chain 17 also engages about a sprocket 18 which is carried by a cam shaft 19. A timer 20 is operated by the cam shaft 19 and the timer 20 is of conventional construction.

A grooved pulley 21 is mounted on the rear end portion of the crank shaft 13 and has trained thereabout a belt 22 which is also trained about a fan pulley 23. The fan pulley 23 has secured thereto a fan 24 and a guard 25 engages the rear portion of the fan 24. A generator 26 is also secured to the pulley 23 and the generator 26 is supported by means of a bracket arm 27 engaging a bolt 28 by means of which the belt 22 may be maintained tight for operating the generator 26 and the fan 24. The engine 10 also has associated therewith a starter motor 29 having a spring-pressed starter pinion 30 which is engageable with a gear 31 formed on a fly wheel 32. The fly wheel 32 is secured to the forward portion of the crank shaft 13 and is positioned within a housing 33 extending from the forward end of the crank case 11. The crank shaft 13 also has secured thereto a gear 34 which meshes with a gear 35 connected to a lubricating pump 36. A carburetor 37 is also coupled with the engine 10 and is connected by means of a pipe 38 to a fuel tank 39.

A shield 40 engages about the upper portion of the engine 10 and extends partly over the fuel tank 39 as indicated at 41. A battery 42, which is positioned in a battery housing 43 disposed forwardly of the fuel tank 39, is electrically coupled to the starter motor 29 and the generator 26 in conventional manner by the medium of conductors 44 and 45. The extended portion 41 of the shield 40 is secured by fastening members 46 to the upper rear portion of the battery housing 43, as shown more clearly in Figure 2. The fly wheel 32 also has extending from the forward side thereof an annular flange or clutch member 47. A plurality of clutch plates 48 are fixed relative to the flange or clutch member 47 and are slidable on ribs or keys 49 carried by the flange 47 and clutch elements 50 are correlated with the clutch members 49 and are keyed to a carrier 51 of cylindrical construction.

Figure 2:
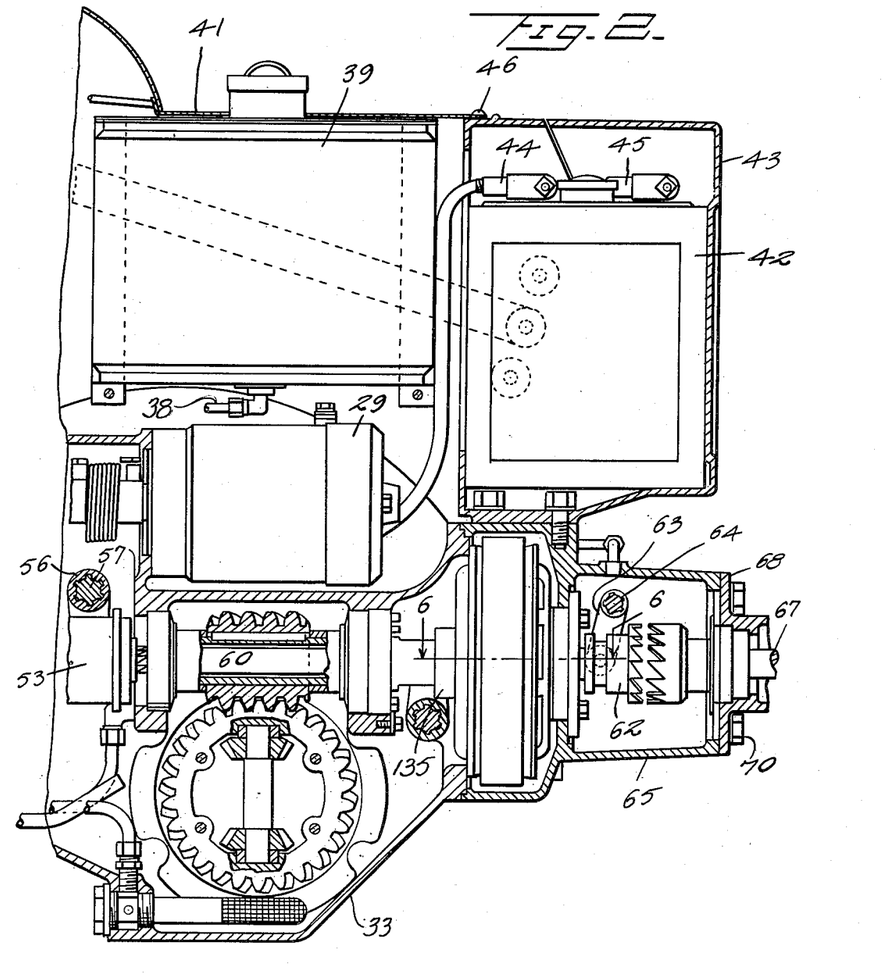
Figure 2 is a fragmentary vertical section of the transmission which is coupled to the engine shown in Figure 1.

The carrier 51 is formed at its rear end with an annular flange 52 against which the rear one of the clutch plates 50 is adapted to engage. A clutch collar 53 is carried by a cylindrical extension or hub 54 formed integral with the carrier 51 and the collar 53 is adapted at its rear end to bear against the foremost of the clutch plates 50, so as to bind the clutch plates 50 with respect to the clutch plates 48. The collar 53 is adapted to be moved forwardly to declutching position against the tension of a clutch engaging spring 55 which is disposed between the collar 53 and the hub 54 by means of a shifting fork 56. The shifting fork 56 is splined on a clutch operating shaft 57 which is extended outwardly of the clutch housing 33 and is operated in a conventional manner.

The clutch engaging spring 55 bears at its forward end against a ring 58 fixed relative to the clutch collar 53 and the ring 58 is adapted to engage at its forward end against an annular key or ring 59 which is carried by the forward end of the hub 54. The hub 54 is internally splined and has positioned therein the rear end of a drive shaft 60. The drive shaft 60 extends forwardly and is provided with a splined forward end 61. A toothed coupling collar 62 is splined on the spline 61 and is shifted endwise to either a coupling or released position by means of a shifting fork 63 carried by a shaft 64.

Figure 5:
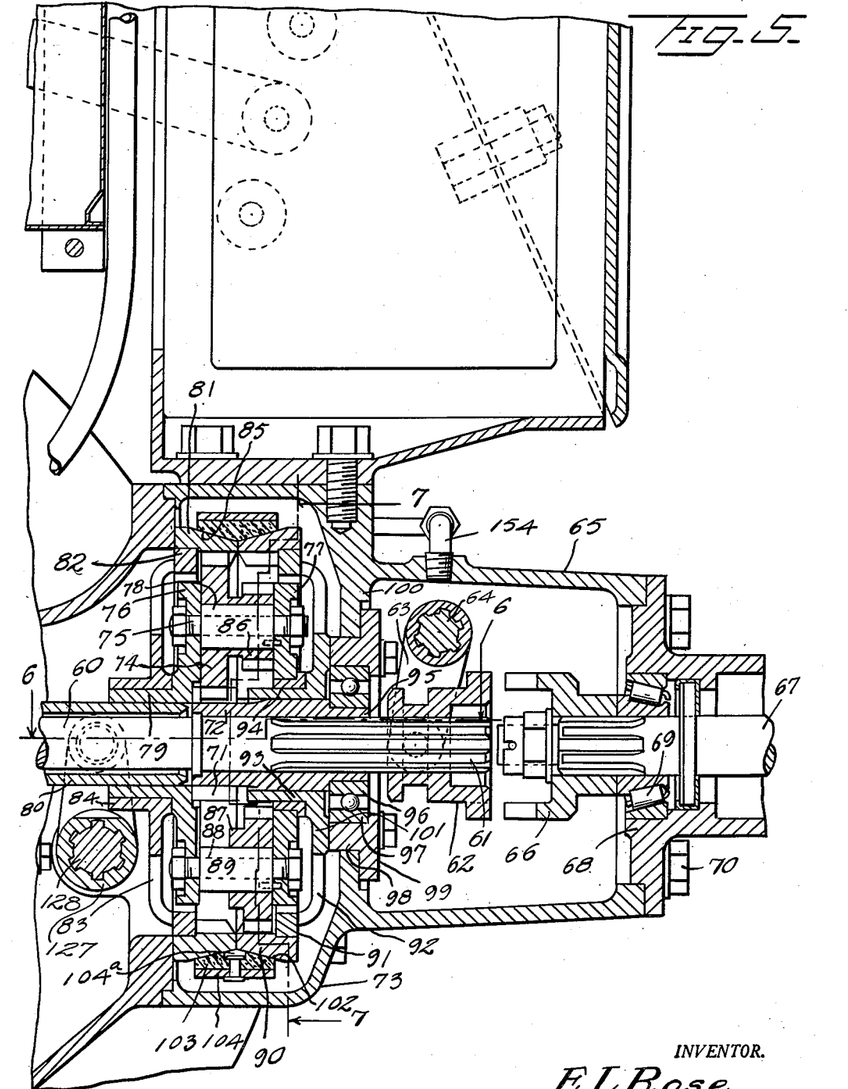
Figure 5 is a fragmentary vertical section of the rear portion of the transmission.
Figure 6:
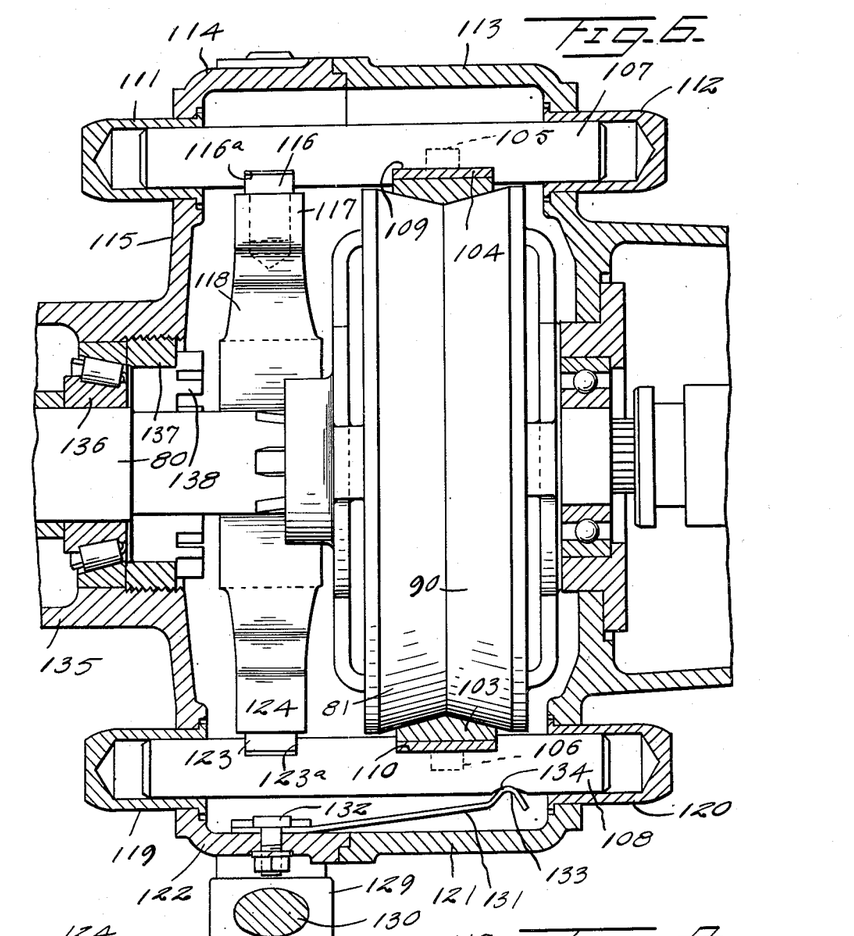
Figure 6 is a sectional view taken on the line 6—6 of Figures 2 and 5.

The shaft 64 extends horizontally in a coupling housing 65 and is provided with the usual connections by means of which the shaft 64 may be selectively rocked to shift the coupling member 62 rearwardly to released position, as shown in Figure 5, or to shift the coupling member 62 forwardly to coupling position for engagement with a complementary toothed coupling member 66 which is splined on a driven shaft 67. The driven shaft 67 extends through the forward wall 68 of the coupling housing 65 and anti-friction bearing 69 carried by the wall 68 rotatably supports the rear end of the driven shaft 67. The wall 68 is detachably secured to the coupling housing 65 by fastening members 70 by means of which the driven shaft 67 may be removed with any implement associated therewith and different types of implements, such as mowers, plows or other earth working implements, may be operatively coupled to the driving mechanism.

The drive shaft 60 has splined on the splines 61 rearwardly of the coupling member 62, a gear or pinion 71 which is formed with a relatively long hub 72. The gear or pinion 71 comprises the sun gear of a planetary transmission which is positioned in a transmission housing 73 extending from the rear end of the coupling housing 65.

Figure 7:
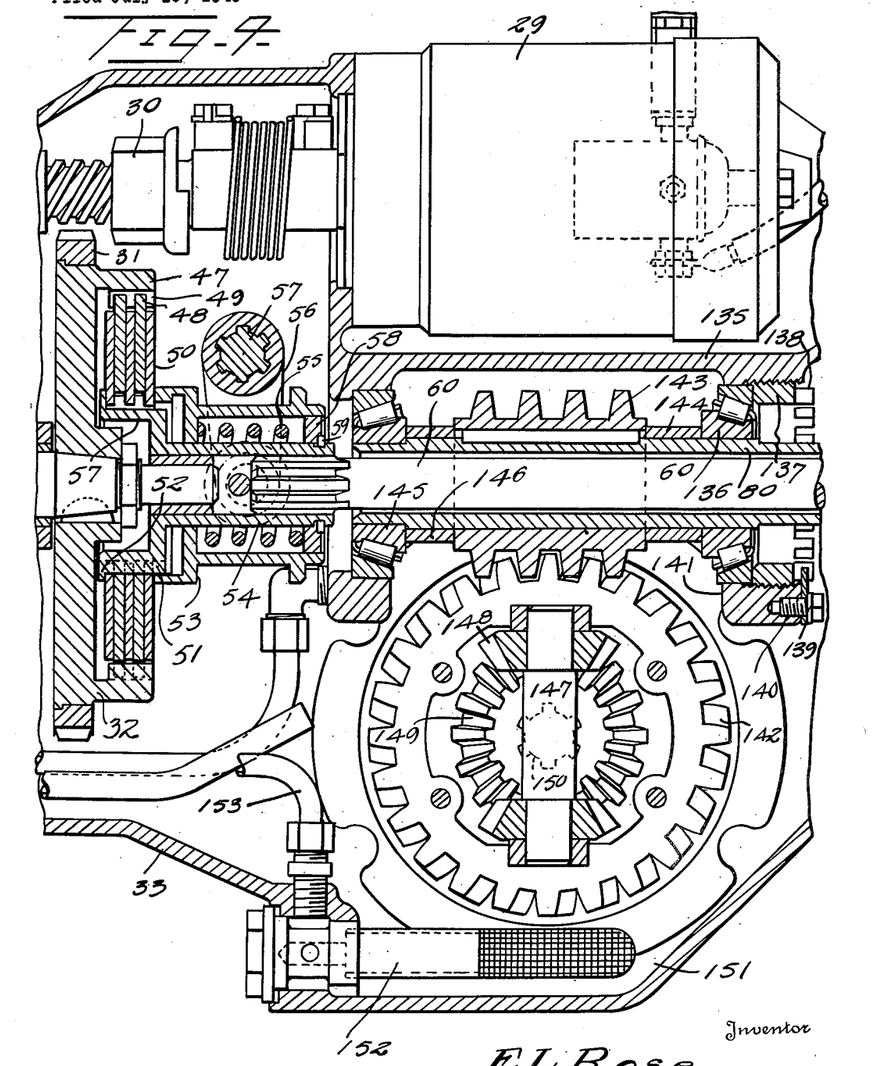
Figure 7 is a sectional view taken on the line 7—7 of Figure 5.

The sun gear 71, as shown in Figure 7, has meshing therewith a plurality of planet gears 74. The planet gears 74 are rotatably mounted on stub shafts 75 which are secured between a pair of disk-shaped plates 76 and 77. A sleeve 78 is interposed between each stub shaft 75 and the planet gear and provides a spacer for holding the two plates 76 and 77 in spaced apart relation. The sleeves 78 also provide a bearing for each planet gear 74. The plate 76 is formed with a cylindrical hub 79 which in splined on the forward end of a tubular shaft 80. The shaft 80 is disposed about the drive shaft 60 and extends rearwardly from the transmission housing 73. The planet gears 74 constitute the forward drive gears for operating the tubular shaft 80 to effect forward movement of the tractor body associated with this device. A ring gear 81 is disposed about the planet gears 74 and meshes with each of these gears and is carried by an annulus 83, which is fixed relative to the ring gear 81 and has formed integral therewith a plurality of radially arranged arms 83 carried by a cylindrical hub 84, which is loose on the periphery of the hub 79.

The periphery of the ring gear 81 is of frustoconical configuration as indicated by the numeral 85 and forms one element of a brake by means of which the ring gear 81 may be held against rotation. The planet gears 74 have formed integrally therewith secondary planet gears 86 which extend forwardly from the gears 74. The secondary planet gears 86 which constitute reversing gears, as shown in Figure 7, are adapted to mesh with idler gears 87. The idler gears 87 are rotatably mounted on shafts 88 fixed between the two plates 76 and 77 and the idler gears 87 are rotatable on spacer sleeves 89 engaging about the shafts 88. The idler gears 87 are in constant mesh with a ring gear 90 and the gear 90 is carried by an annulus 91. The annulus 91 has fixed thereto a plurality of radially arranged arms 92 which are carried by an inwardly projecting hub 93 which is rotatable about the hub 72 of the sun gear 71. A thrust bearing 94 is interposed between the inner circle of the plate 77 and the hub 93 so that the spider formed by the hub 93, the arms 92 and the annulus 91 may freely rotate relative to the hub 72 of the sun gear. The forward end of the hub 72 of the sun gear is reduced in diameter as indicated at 95 for receiving the inner race 96 of an anti-friction bearing. The outer race 97 of this anti-friction bearing engages in an annular flange 98 carried by a plate 99. The plate 99 is fixed relative to a dividing wall 100 between the coupling housing 65 and the transmission housing 73.

The inner or rear end of the flange 98 is adapted to bear against the forward side of an annular flange 101 carried by the hub 93 and forming part of the spider. The annular flange 101 also bears against the outer race 97 of the anti-friction bearing. The outer surface of the ring gear 90 is of frusto-conical configuration as indicated by the numeral 102 and forms one element of a reversing brake. The confronting ends of the two rings gears 81 and 90 are in substantial contact with each other and the frusto-conical brake surfaces 85 and 102 form a V-shaped brake means within which a fibrous brake ring 103 carried by a band 104 is adapted to engage. The inner surface of the band 103 as indicated at 104$^a$ is of V-shaped configuration, so that endwise movement of the band 104 will effect gripping engagement of this band with either ring member 81 or ring member 90. The band 104 is formed with opposed pairs of ears 105 and 106, as shown in Figure 7, between which band shifting rods 107 and 108 respectively are adapted to engage. The rod 107 is formed with a peripheral notch 109 within which the band 104 is adapted to engage and the rod 108 is formed with a notch 110 within which the band 104 is adapted to engage.

By providing the diametrically opposed rods 107 and 108, the band 104 will be shifted endwise in an even manner so as to provide for braking of one or the other of the ring gears. The rod 107 is slidable endwise in a pair of bushings 111 and 112, which are carried by an offset housing 113 formed as part of the housing 73 and a complementary offset housing 114 carried by a plate 115 supports the bushing 111 in alignment with the bushing 112. The rod 107 is shifted endwise by means of a stud 116 fixed in a socket 117 carried by a band shifting fork 118 and which loosely engages in a slot 116—a formed in rod 107. The rod 108 is slidable in a pair of bushings 119 and 120 carried by laterally offset and aligned housings 121 and 122. The rod 108 is shifted endwise by means of a stud 123 fixed in a socket 124 carried by the fork 118 and engaging in a slot 123—a formed in rod 108.

The fork 118, as shown in Figure 8, is formed with a pair of oppositely extending arms 125 and 126 which are carried by a sleeve 127. A fork operating shaft 128 is fixed in the sleeve 127 and has secured thereto the hub 129 of a fork shifting lever 130. In order to provide for maintaining the fork 118 and the rods 107 and 108 in a neutral position, I have provided a spring 131 which is fixed, as at 132, to the offset housing 122 and is formed with a V-shaped forward end 133. The forward end 133 of the spring 131 is adapted to engage in a notch 134, which is formed in the outer side of the rod 108. It will be understood that the shifting lever 130 may be locked in either forward or reversed position by suitable means (not shown), such as a toothed quadrant, which is engaged by a spring pressed pawl or the like.

The plate 115 has extending rearwardly therefrom a shaft enclosing sleeve 135. The sleeve 135 is formed integral with the plate 115 and also is formed integral with the intermediate housing 33. The tubular shaft 80 is journalled in anti-friction bearings 136 disposed within the forward end of the sleeve 135 and adjusted endwise by means of an annular nut 137 which is threaded in the forward end of the sleeve 135. The nut 137 is formed with a plurality of teeth 138 by means of which a spanner wrench or the like may be engaged with the nut, so as to tighten or loosen the nut and in order to hold this nut against rotation, I have provided a locking member 139 carried by a cap screw 140 which is threaded into the forward portion of the sleeve 135 and engages between selected pairs of the teeth 138. The sleeve 135, as shown in Figure 4, is cut out in the lower portion thereof, as indicated at 141 so as to provide space within which a ring and worm gear 142 may engage. A worm 143 is keyed or splined on the tubular shaft 80 in the space formed by the cutout 141 of the sleeve 135 and preferably a spacer sleeve 144 is interposed between the forward end of the worm 143 and the anti-friction bearing 136.

A second anti-friction bearing 145 engages about the rear end portion of the shaft 80 being disposed in the rear end of the sleeve 135 and a spacer sleeve 146 is interposed between the anti-friction bearing 145 and the rear end of the worm 143. The ring gear 142 forms part of a differential gearing which has rotatably mounted on a stub shaft 147 a pair of beveled pinions 148 for driving an axle 150 of the tractor. The pinions 148 mesh with a beveled gear 149 which is splined on the axle 150. It will be understood that axle 150 is formed as two transversely disposed aligned shafts and that the ring gear 142 is fixed relative to one and that the bevel gear 149 is splined to the other shaft. The housing 33 is formed with an oil sump or well 151 within which a strainer 152 connected to a suction pipe 153 engages, and the pipe 153 is connected in a conventional manner to the lubricating pump 36 on the intake side thereof. An oil discharge pipe 154 is connected to the top of the coupling housing 65 and is also connected to the outlet side of the pump 36 for discharging lubricating oil into the coupling housing 65, from which the lubricant will flow downwardly by gravity through the transmission housing 73 and into the intermediate or differential housing 33.

In the use and operation of this power device, the engine 10 is operated in the usual manner and initially the clutch formed by the plates 48 and 50 will be in disengaged position. When it is desired to move the device over the ground, it being understood that the axles 150 will have wheels mounted on the outer ends thereof, the clutch shifting fork 56 is rocked to lock the clutch elements 48 and 50 together. When these clutch elements 48 and 50 are locked together, drive shaft 60 will rotate as a unit with crank shaft 13. Assuming that it is desired to move the device forwardly over the ground, lever 130 is rocked rearwardly so as to cause band 103 to frictionally lock gear 81 against rotation. With gear 81 held against rotation, the planet gears 74 will rotate within the ring gear 81 and cause plates 76 and 77 to rotate about the tubular shaft 80 and thereby effect said rotation of shaft 80. As planet gears 74 rotate within the stationary ring gear 81 which is held against rotation, plates 76 and 77 will rotate and as plate 76 is splined to tubular shaft 80 through the hub 79, shaft 80 will rotate to effect forward rotation of the axles 150. Quick reverse rotation of axles 150 is obtained by rocking lever 130 forwardly and locking ring gear 90 against rotation. With ring gear 90 held against rotation, planet gears 86 are in driving relation with respect to idler gears 87 and in this manner these gears will rotate within ring gear 90 and tubular shaft 80 will be rotated in a reverse direction.

When ring gear 81 is held stationary, ring gear 90 may rotate freely and when ring gear 91 is held against rotation, ring gear 81 may freely rotate. If it is desired to operate the implement or attachment connected to shaft 67, coupling member 62 is shifted forwardly to effect engagement with coupling member 66. Shaft 67 will rotate at the same speed as shaft 60. In effecting reverse rotation of the axles 150, the clutch members 48 and 50 may be left in clutching position as the shifting of the band 104 and the braking band 103 will constitute a releasing means so as to prevent damage to the gears of the planetary transmission during the changing of the movement of the device over the ground.

This device is constructed as a compact driving unit operated from a conventional internal combustion engine and unit which may be mounted on a pair of wheels so that the device can be readily guided over the ground.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What I claim is:

A planetary transmission comprising a drive shaft, a sun gear fixed on said drive shaft, a pair of plates rotatable about said drive shaft, planet gears carried by said plates, reversing gears carried by one of said plates, a pair of ring gears, one of said ring gears meshing with said planet gears, the other of said ring gears meshing with said reversing gears, opposed frustro-conical brake elements on the periphery of said ring gears disposed in inwardly convergent relation, a single brake band about both of said brake elements and having a bearing surface complementary thereto, and means sliding said brake band axially of said transmission for frictionally engaging a selected one of said brake elements, said means including a pair of rods secured to said brake band at diametrically opposed points on the periphery thereof, bushings receiving the opposite ends of said rods for mounting said rods for sliding parallel to the axis of rotation of said transmission, slots formed in said rods at right angles to said axis of rotation, a crank member rockable transversely of said axis of rotation, portions of said crank member slidably engaging in said slots, a handle on said crank member, a detent formed in one of said rods and a spring pressed member engageable in said detent for maintaining said brake band in neutral position.

EUSTACE LORING ROSE.

REFERENCES CITED

The following references are of record in the file of this patent:

UNITED STATES PATENTS

| Number | Name | Date |
|---|---|---|
| 740,128 | Harvey | Sept. 29, 1903 |
| 1,239,252 | Baukat | Sept. 4, 1917 |
| 1,423,426 | Howeth | July 18, 1922 |
| 1,553,088 | Link | Sept. 8, 1925 |
| 1,641,803 | Danly | Sept. 6, 1927 |
| 1,654,432 | Rowledge | Dec. 27, 1927 |
| 1,889,718 | Weingartner | Nov. 29, 1932 |

FOREIGN PATENTS

| Number | Country | Date |
|---|---|---|
| 17,779 | Netherlands | July 16, 1928 |
| 226,742 | Switzerland | Apr. 30, 1943 |